United States Patent [19]

Jovick

[11] 4,132,293

[45] Jan. 2, 1979

[54] AXLE ASSEMBLY WITH SINTERED METAL ROTOR

[75] Inventor: Raymond J. Jovick, Troy, Mich.

[73] Assignee: Rockwell International Corporation, Pittsburgh, Pa.

[21] Appl. No.: 879,550

[22] Filed: Feb. 21, 1978

Related U.S. Application Data

[63] Continuation of Ser. No. 785,134, Apr. 6, 1977, which is a continuation of Ser. No. 661,147, Feb. 25, 1976, abandoned.

[51] Int. Cl.$^2$ .............................................. B60T 8/08
[52] U.S. Cl. .................................. 188/181 R; 310/261
[58] Field of Search ...................... 188/181 A, 181 R; 303/103, 105; 310/168, 261

[56] References Cited

U.S. PATENT DOCUMENTS

| | | | |
|---|---|---|---|
| 2,913,819 | 11/1959 | Andreotti et al. | 310/261 X |
| 3,651,901 | 3/1972 | Burckhardt et al. | 188/181 A |
| 3,910,386 | 10/1975 | Stigall et al. | 188/181 R |

*Primary Examiner*—Duane A. Reger

[57] ABSTRACT

This invention relates to a vehicle axle assembly comprising an axle, means for rotatably mounting a ground engaging wheel at each end of the axle, a fluid power brake mechanism mounted to the axle adjacent each end thereof, each brake mechanism being operative when actuated to restrain rotation of a wheel rotatably mounted at that end of the axle, a valve having a body, means providing a source of pressurized fluid to the body, conduits connecting the body to the brake mechanism at each end of the axle, relay means within the body being operable when actuated to modulate fluid pressure from the source to the brake mechanism, a wheel speed sensor mounted at each end of the axle, an annular sintered metal rotor press fitted on a hub rotatably mounted on each end of the axle and supporting the wheel, the rotor having a plurality of circumferentially and equally spaced notches, the notches so disposed on the rotor to angularly sweep by the sensor, the sensor adapted to generate electrical signals indicative of the angular velocity of the rotor and in turn of the hub and the wheel associated therewith, means for modulating the operation of the relay valve mounted in the body comprised of electrical means mounted in the body and electrically connected to the wheel speed sensors.

1 Claim, 6 Drawing Figures

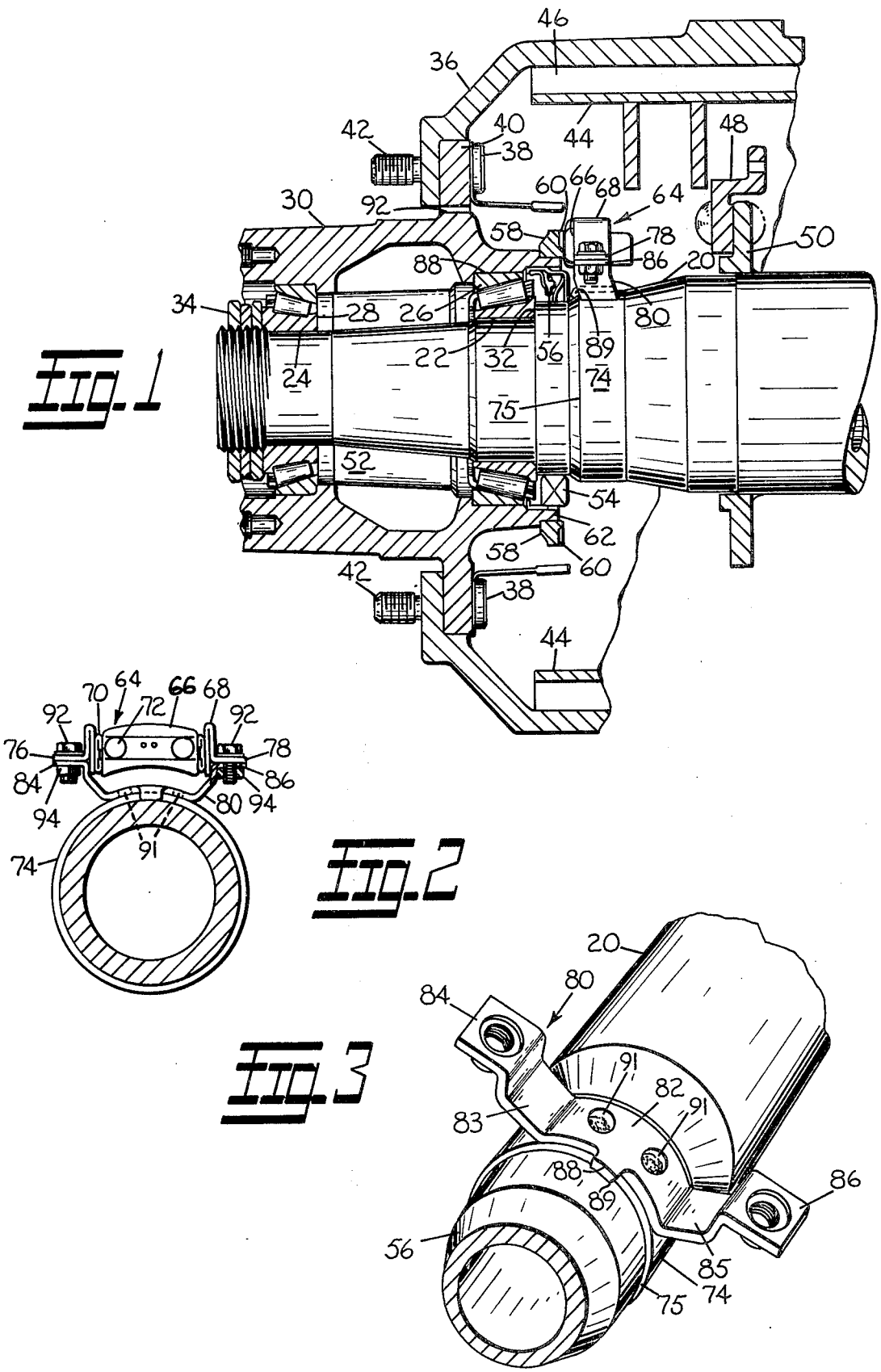

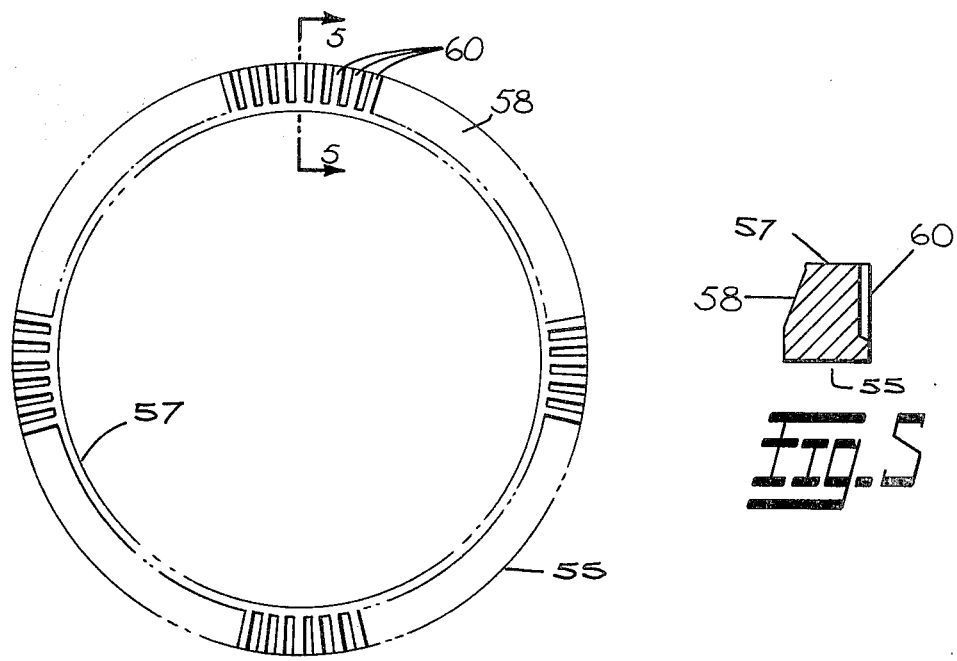
Fig. 4
Fig. 5
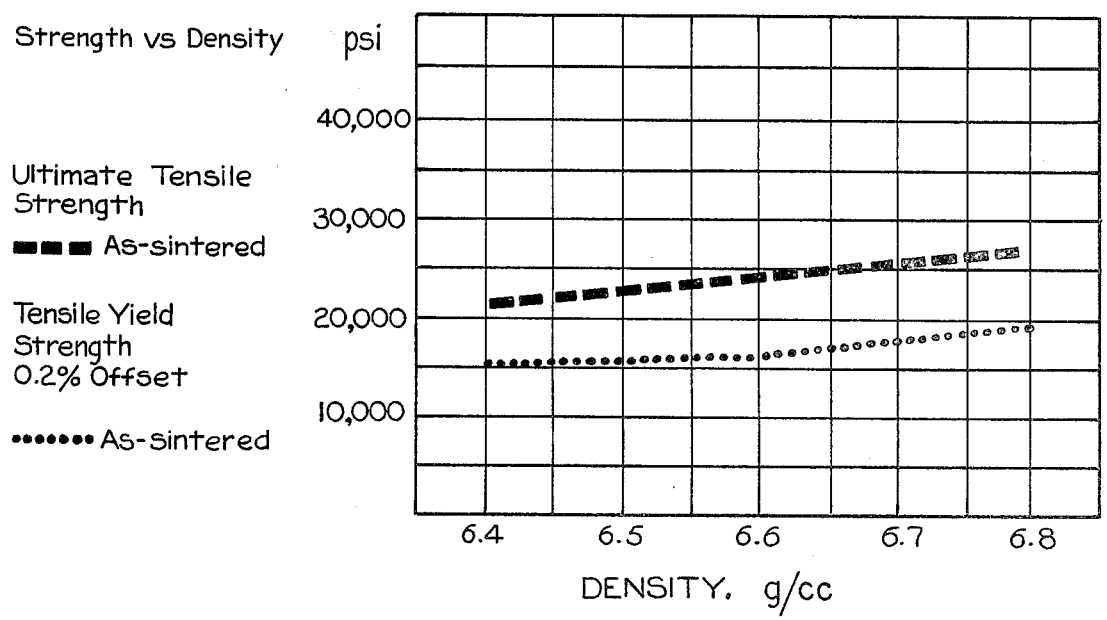
Fig. 6

AXLE ASSEMBLY WITH SINTERED METAL ROTOR

This application is a continuation of Ser. No. 785,134, filed Apr. 6, 1977, which is a continuation of Ser. No. 661,147 filed Feb. 25, 1976, abandoned.

BACKGROUND OF THE INVENTION

The present invention relates to a vehicle axle assembly comprising an axle, means for rotatably mounting a ground engaging wheel at each end of the axle, a fluid power brake mechanism mounted to the axle adjacent each end thereof, each brake mechanism being operative when actuated to restrain rotation of a wheel rotatably mounted at that end of the axle, a valve having a body, means providing a source of pressurized fluid to the body, conduits connecting the body to the brake mechanism at each end of the axle, relay means within the body being operable when actuated to supply fluid pressure from the source to the brake mechanism, a wheel speed sensor mounted at each end of the axle, an annular sintered metal rotor press fitted on a hub rotatably mounted on each end of the axle and supporting the wheel, the rotor having a plurality of circumferentially and equally spaced notches, the notches so disposed on the rotor to angularly sweep by the sensor, the sensor adapted to generate electrical signals indicative of the angular velocity of the rotor and in turn of the hub and the wheel associated therewith, means for modulating the operation of the relay valve mounted in the body comprised of electrical means mounted in the body and electrically connected to the wheel speed sensors.

Most vehicle anti-skid brake control system function in response to electrical signals indicative of the angular velocity of one or more of the vehicle wheels. Generally, these signals are derived from an electromagnetic sensor including a magnet carried by a stationary portion of the vehicle such as the axle housing, and a toothed or notched ring or rotor rotatable with the wheel opposite the magnet. As the teeth or notches of the ring pass the magnetic sensor unit the resulting variations in flux generate a signal, the frequency of which is a function of the angular velocity of the wheel.

To produce the required accuracy of the velocity signal, the sensor unit and rotor must be precisely located with respect to each other and must remain in a preselected relationship even after extended operation in which the components are subjected to road shocks and constant vibration. It is also essential that installation of the components be compatible with mass production techniques. The mounting of the sensor units must also be such that upon reinstallation of a wheel after removal for repair, the parts will automatically be restored to their original operating position.

Wheel speed sensor modules including means permitting automatic adjustment of the magnetic sensor units relative to a rotor are disclosed in U.S. Pat. No. 3,772,548 which issued to R. C. Wroblewski, et. al. on Nov. 13, 1973 and Patent Application Ser. No. 527,609, filed on Nov. 27, 1974 and assigned to the assignee of the present invention. Those modules comprise magnetic sensor units which are movable relative to a supporting frame or housing. An improved sensor module bracket is as set forth in U.S. Pat. Application Ser. No. 621,216 filed Oct. 9, 1975 and entitled "Sensor Module Bracket".

The present invention provides a sintered metal rotor to be used in conjunction with wheel speed sensors as, for example, the above-noted wheel speed sensor to produce the required velocity signal that in turn drives the electromagnetic and electronic mechanisms to control the brakes of a vehicle, particularly in a potential "skid" situation.

SUMMARY OF THE INVENTION

It is a primary object of the present invention to provide a vehicle axle assembly comprising an axle, means for rotatably mounting a ground engaging wheel at each end of the axle, a fluid power brake mechanism mounted to the axle adjacent each end thereof, each brake mechanism being operative when actuated to restrain rotation of a wheel rotatably mounted at that end of the axle, a valve having a body, means providing a source of pressurized fluid to the body, conduits connecting the body to the brake mechanism at each end of the axle, relay means within the body being operable when actuated to modulate fluid pressure from the source to the brake mechanism, a wheel speed sensor mounted at each end of the axle, an annular sintered metal rotor press fitted on a hub rotatably mounted on each end of the axle and supporting the wheel, the rotor having a plurality of circumferentially and equally spaced notches, the notches so disposed on the rotor to angularly sweep by the sensor, the sensor adapted to generate electrical signals indicative of the angular velocity of the rotor and in turn of the hub and the wheel associated therewith, means for modulating the operation of the relay valve mounted in the body comprised of electrical means mounted in the body and electrically connected to the wheel speed sensors.

It is a further object of the present invention to provide a vehicle axle assembly wherein the annular sintered metal rotor is a sintered iron motor having a chemical composition by percent of iron from 97.7% to 100% and of carbon from 0% to 0.3%.

It is another object of the present invention to provide a vehicle axle assembly wherein the annular sintered metal rotor has a density of between 6.4 grams per cubic centimeter and 6.8 grams per cubic centimeter.

It is yet a further object of the present invention to provide a vehicle axle assembly wherein the ultimate tensile strength of the annular sintered metal rotor is 24,000 pounds per square inch.

It is still another object of the present invention to provide a vehicle axle assembly wherein the hub is provided with an annular mounting surface coaxially with the rotational center of the hub and the wheel associated therewith, the sintered metal rotor being mechanically press fitted on the hub at the annular mounting surface.

It is still a further object of the present invention to provide a vehicle axle assembly wherein the notches are disposed on a radially extending face of the rotor so that they radially emanate from the rotational center of the hub.

It is another object of the present invention to provide a vehicle axle assembly wherein the sintered metal rotor is press fitted on the hub at the annular mounting surface, the inner cylindrical surface of the rotor being in interlocking relationship with the annular mounting surface.

It is yet a further object of the present invention to provide a vehicle axle assembly wherein the hub is provided with a cover fixedly attached thereto, an annular mounting surface provided on the inner surface of the cover coaxial with the rotational center of the hub and the wheel associated therewith, the sintered metal rotor being mechanically press fitted in the cover at the annular mounting surface.

It is also an object of the present invention to provide a vehicle axle assembly wherein the sintered metal rotor is press fitted in the cover at the annular mounting surface, the outer cylindrical surface of the rotor being in interlocking relationship with the annular mounting surface.

It is also a further object of the present invention to provide a vehicle axle assembly which has precisely controlled dimensions and precisely controlled teeth or notch configurations which is inexpensive to manufacture, simplistic in design and susceptible to high volume automated manufacturing techniques.

Other objects of the present invention and details of the vehicle axle structure and its associated sintered metal rotor will appear more fully from the following description and accompanying drawings.

BRIEF DESCRIPTION OF THE DRAWINGS

In the drawings, wherein like reference numerals designate like parts throughout:

FIG. 1 is a fragmentary view partly in section, showing the outer end of an axle and a sintered metal rotor mounted in accordance with the present invention;

FIG. 2 is an end view, partly in section, showing a sensor module, bracket and axle of FIG. 1;

FIG. 3 is a perspective view showing the sensor mounting bracket and part of the axle outer end of FIG. 1;

FIG. 4 is a front plan view of the sintered metal rotor in accordance with the present invention;

FIG. 5 is a sectional view of the sintered metal rotor of FIG. 4 taken along lines 5—5; and FIG. 6 is a graphic presentation of a sintered iron rotor showing typical strength versus density properties.

DESCRIPTION OF THE INVENTION

For present purposes the invention will be disclosed as applied to a non-steerable vehicle axle, such as a trailer axle designed for heavy-duty use. As used herein the term "axle" is intended to refer to any component on which a wheel hub may be rotatably mounted and includes components sometimes called spindles or axle housings. In a similar manner "sensor module" is intended to mean the magnetic sensor unit and the housing or frame it may be supported in as well as a magnetic sensor unit alone when it is not carried by a separate housing or frame.

With reference to the drawings, there is shown the outer end of a hollow tubular axle 20. The outer end of the axle 20 is provided with a pair of bearing seats 22 and 24 for inner and outer bearing assemblies 26 and 28 upon which the wheel hub 30 is supported. Upon installation of the wheel hub the inner bearing 26 is moved into position against an accurately located radial shoulder 32 on the axle 20 and the parts are locked in this position by a lock nut assembly 34 threaded to the axle 20 and bearing against the inner race of the outer bearing assembly 28 to impart a predetermined preload to the two bearing assemblies 26 and 28.

The brake drum 36 is secured by a plurality of bolts 38 to a radially extending flange 40 on the wheel hub 30, the flange also carrying a plurality of wheel mounting studs 42 circumferentially spaced from the bolts 38. The brake assembly, which is conventional, includes brake shoes 44 carrying linings 46 and a brake operating mechanism, not shown, carried by a spider or backing plate, a portion of which is shown at 48 mounted on a radial flange 50 welded to the axle 20.

Lubricant for the bearing assemblies 26 and 28 is carried in a cavity 52, the outer end of which is sealed by means not shown. The inner end of the cavity 52 is sealed by a seal member 54 seated on a cylindrical surface 56 of the axle 20.

The wheel speed sensor assembly at the outer end of the axle 20 is comprised of a sintered metal ring or rotor 58 carried by the wheel hub 30 and a sensor module 64. The ring 58 has a plurality of circumferentially and equally spaced notches or teeth 60 on its inboard surface. The ring 58 is mounted for rotation with the wheel hub 30 and may be press fitted onto an annular mounting surface 62. The thrust of the present invention is directed to the provision of such a sintered metal rotor 58 and such rotor 58 has unusual properties making it particularly adaptable to be press fitted on or within a rotating part of an axle assembly. As can be seen in FIG. 6, a sintered metal rotor has desirable mechanical strength versus density characteristics having an ultimate strength of approximately 24,000 p.s.i. with a tensile yield strength with a 0.2% offset of approximately 16,000 p.s.i. These mechanical characteristics occur within a range of density of 6.4 to 6.8 g/cc. The sintered metal rotor may have a chemical composition by percent of iron from 97.7 to 100 and carbon from 0 to 0.3. The combined carbon, on the basis of iron only, may be metallographic estimate. Other typical properties are as follows:

Allowable Density Variation: 0.3 g/cc
Elongation: 5.0%
Apparent Hardness: Rh 80
Imparct Strength (unnotched charpy): 9.5 ft.-lbs.
Fatigue Strength $0.38 \times$ UTS psi
Young's Modulus $16.0 \times 10^6$ psi
Poisson's Ratio 0.21

The rotor 58 may be manufactured and formed using state-of-the-art techniques to obtain the above-noted mechanical and other characteristics. The rotor 58 can be so manufactured and formed to precisely form its inner cylindrical surface 55, its notches or teeth 60 and its outer cylindrical surface 57. Each of these surfaces, i.e., 55, 57 and 60, are important in that they may have an effect on the preciseness of the electrical signal generated and ultimately sensed by the sensor unit 66. The preciseness and consistency of this signal is critical to the proper functioning of the overall sensing and braking system.

As shown in FIG. 1, the sintered metal rotor 58 is mechanically interlocked on the wheel hub 30 at its inner surface 55. Typically, the wheel hub 30 will have the matching cylindrical surface machined on it to ensure the coaxial relationship of the ring or rotor 58 with respect to the rotational axis of the wheel hub 30. It should be added, however, that the ring or rotor 58 may be mechanically interlocked at its outer cylindrical surface 57. In such a configuration a cap or cover (not shown) may be bolted to the wheel hub 30 and may carry in its inner surface the sintered metal rotor 58. A typical sample of such a configuration may be found in U.S. Patent Application Ser. No. 518,653, filed Oct. 29, 1974, entitled "Hub Cap Speed Sensor" by Raymond J. Jovick.

The magnetic sensor module 64 is comprised of a magnetic sensor unit 66 carried by a frame or housing 68. The sensor unit 66 is preferably supported in the frame 68 by a retainer 70 and resilient means 72 permitting axial movement of the unit 66 relative to the frame 68.

A form of sensor module 64 is mounted to the axle 20 by a stamped metal bracket 80. This sensor module bracket configuration was the subject of a previous patent applicaton (Ser. No. 621,216, filed Oct. 9, 1975). The bracket 80 is an elongated metal body having a center portion 82 and end portions 84, 86 adapted to mount the spaced ends 76, 78 of sensor module 64. A pair of radially extending intermediate portions 83 and 85 of the bracket space the end portions 82, 84 radially outward from the center portion 82 and axle 20. The center portion 82 is cylindrically curved to permit substantial surface-to-surfce contact between the bottom or mounting surface of the center portion 82 and a cylindrical surface 74 of the axle. The end 89 of a locating tab 88 provided at one side of the center portion 82 is bent to project radially inwardly from the curved mounting surface of bracket 80. When the bracket 80 is being mounted to the axle, the end 89 of tab 88 is moved into abutment with a shoulder 75 extending radially inward at one end of the cylindrical surface 74 to axially locate the bracket relative to the edge of surface 74. The bracket is then secured to the axle by weld metal deposited through a pair of apertures or weld ports 91 provided through the center portion 82.

The spaced ends 76, 78 of sensor module 64 are secured to the end portions 84, 86 of bracket 80 by a pair of bolts 92. The bolts extend through apertures provided to the spaced ends 76, 78 of sensor module frame 68 and the end portions 84, 86 of bracket 80. Each of the bolts 92 is threaded into and secured by nuts 94 welded to the undersurface of each portion of the bracket 80.

The bracket 80 thus provides a simple, economical and effective means for mounting a sensor module to the outer end of a vehicle axle. The radially extending intermediate portions of the bracket space the module mounting ends radially outward from the axle and axially off-set the module mounting ends relative to the center portion of the bracket. This configuration locates the sensor module with the magnetic sensor unit in close proximity with and responsive to the toothed, axially inboard surface of the rotor.

What is claimed is:

1. A vehicle axle assembly comprising an axle, means for rotatably mounting a ground engaging wheel at each end of the axle, a brake mechanism mounted to the axle adjacent each end thereof, each brake mechanism being operative when actuated to restrain rotation of a wheel rotatably mounted at that end of the axle, a valve having a body, means providing a source of pressurized fluid to the body, conduits connecting the body to the brake mechanism at each end of the axle, relay means within the body being operable when actuated to modulate fluid pressure from the source to the brake mechanism, a wheel speed sensor mounted at each end of the axle, an annular sintered metal rotor press fitted on a hub rotatably mounted on each end of the axle and supporting the wheel, wherein said hub is provided with an annular mounting surface coaxially with the rotational center of said hub and said wheel associated therewith, said sintered metal rotor being mechanically press fitted on said hub at said annular mounting surface, the said annular sintered metal rotor is a sintered iron rotor having a chemical composition by percent of iron from 97.7% to 100% and of carbon from 0% to 0.3% and having a density of between 6.4 grams per cubic centimeter and 6.8 grams per cubic centimeter, the rotor having a plurality of circumferentially and equally spaced notches, wherein said notches are disposed on a radially extending face of said rotor so that they radially emanate from the rotational center of said hub, the notches so disposed on the rotor to angularly sweep by the sensor, the sensor adapted to generate electrical signals indicative of the angular velocity of the rotor and in turn of the hub and said wheel associated therewith, means for modulating the operation of the relay valve mounted in the body comprised of electrical means mounted in the body and electrically connected to the wheel speed sensors.

* * * * *

UNITED STATES PATENT AND TRADEMARK OFFICE
CERTIFICATE OF CORRECTION

PATENT NO. : 4,132,293
DATED : January 2, 1979
INVENTOR(S) : Raymond J. Jovick

It is certified that error appears in the above-identified patent and that said Letters Patent are hereby corrected as shown below:

Column 4, Line 33, before "metallographic" insert --a--.

Signed and Sealed this

Fifth Day of June 1979

[SEAL]

Attest:

RUTH C. MASON
Attesting Officer

DONALD W. BANNER
Commissioner of Patents and Trademarks